April 16, 1963 F. L. HANSEN ET AL 3,085,385
ROTARY GANG MOWER
Filed Dec. 16, 1959 3 Sheets-Sheet 1
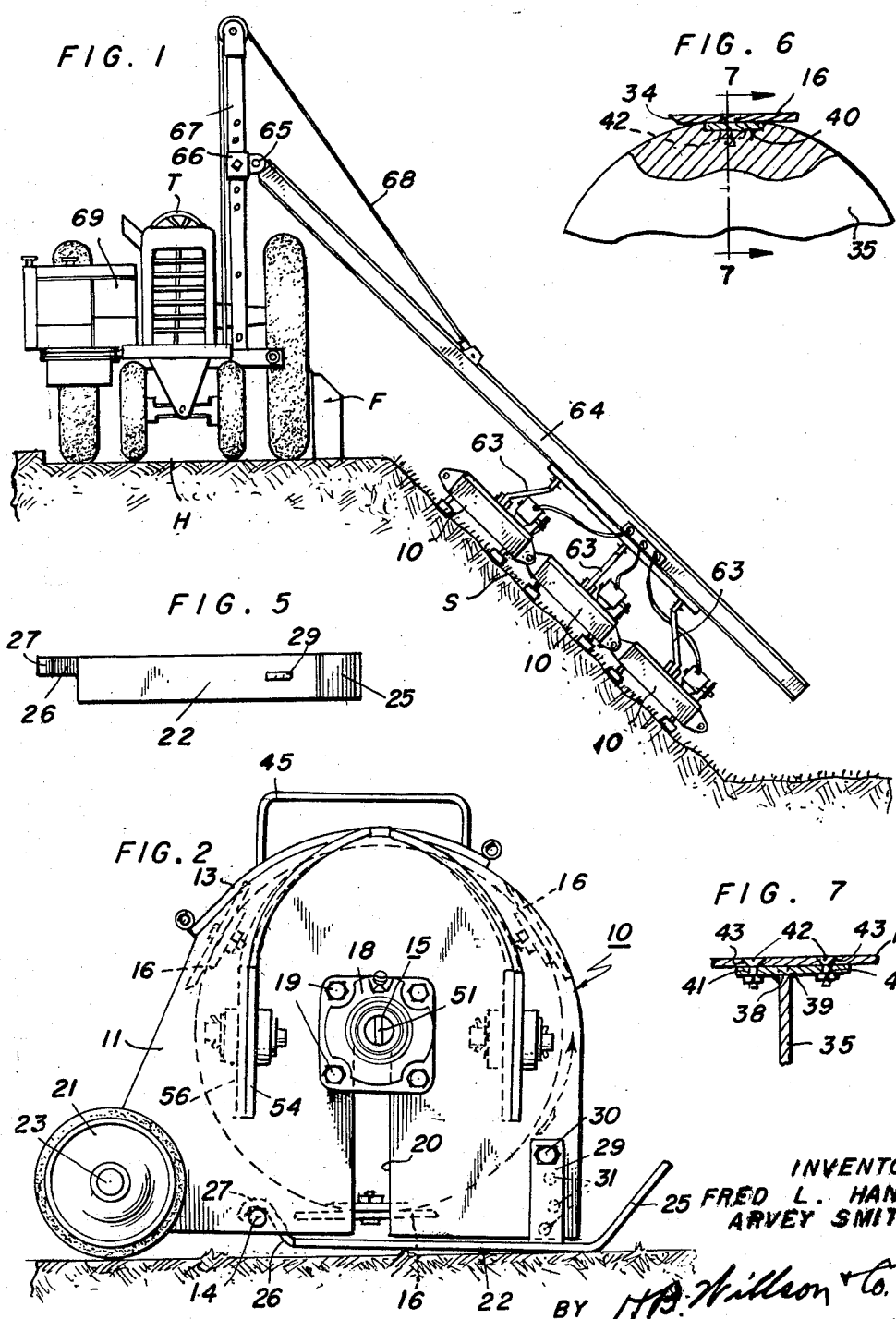
INVENTORS
FRED L. HANSEN
ARVEY SMITH
BY
ATTORNEYS April 16, 1963  F. L. HANSEN ET AL  3,085,385
ROTARY GANG MOWER
Filed Dec. 16, 1959  3 Sheets-Sheet 2

INVENTORS
FRED L. HANSEN
ARVEY SMITH
BY
ATTORNEYS

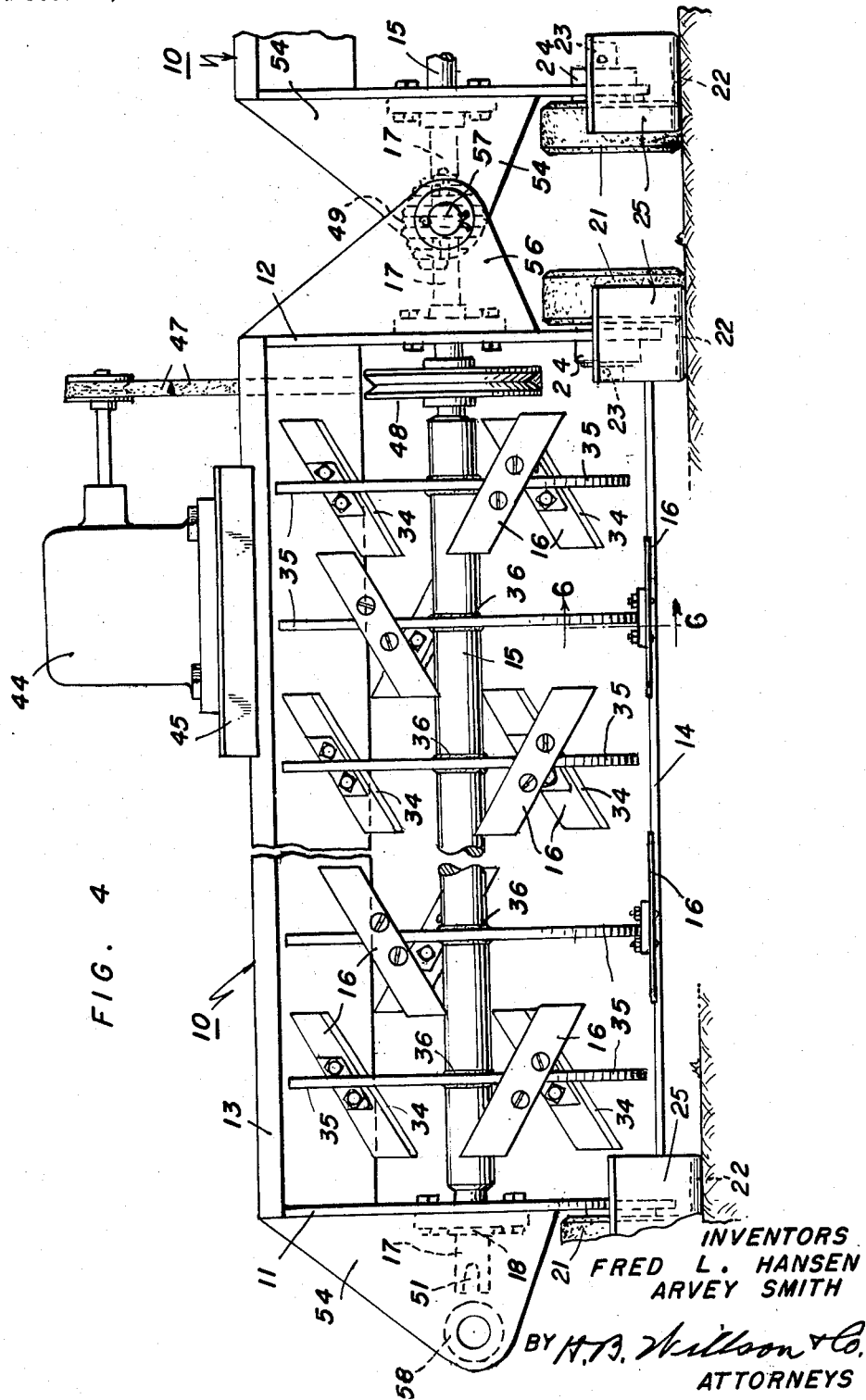

United States Patent Office 3,085,385
Patented Apr. 16, 1963

1

3,085,385
ROTARY GANG MOWER
Fred L. Hansen, 508 Illini Court, and Arvey Smith,
130 N. Glenwood, both of Springfield, Ill.
Filed Dec. 16, 1959, Ser. No. 859,935
3 Claims. (Cl. 56—7)

This invention relates to cutting mechanisms for power operated grass and weed mowers.

The mechanism is especially adapted for heavy duty mowing, such as cutting terraces and slopes along the sides of highways and railway tracks. While the cutting mechanism may be used in a single unit mower, it is particularly useful in gang mowers in which the mower units are in one or more rows, the mowers in at least the front row being pivoted to each other end-to-end so that such row of mowers is flexible and will adapt itself to the contour of the ground and hence will mow uneven and nonuniform terrain. In mowing either cut or fill types of slopes along a highway or railway roadbed, the gang of mower units will be adjustably attached to and pulled by a vertically swinging boom extending from one side of a tractor which travels along the side of the highway or a car which travels on track rails, the tractor or car being power propelled and having cable means for adjusting the boom vertically. In such a flexible gang mower the cutting mechanism of each of the mower units may be driven by a separate motor, such as a gas engine, an electric motor or a hydraulic motor, mounted on the frame of the mower unit and belted to the shaft of the cutter, or a motor mounted on one of the mower units may drive the cutters of two or more of the longitudinally alined mower units by providing driving connections between the cutter shafts of adjoining units. When electric motors are employed, the current may be supplied to them by cables extending from a power-driven electric generator on the tractor or car, and when hydraulic motors or the like are used, a suitable power plant may be carried by the tractor or car, so that the cutter driving means of the several mower units may be controlled by an operator on the tractor or car.

One object of the invention is to provide an improved mower unit of the above indicated character which is of simple and relatively inexpensive construction, highly effective in cutting grass and weeds on slopes and inclined areas, and very economical in use.

Another object is to provide an improved cutter means for a mower unit in which the shaft of the cutter carries longitudinally spaced spiders or disks, each carrying an annular series of peripherally spaced brackets and the grass cutting is done by short straight blades or knives extending angularly with respect to the axis of rotation of the cutter and being removably fastened midway of their ends on the brackets by screws or bolts so that the knives may be easily replaced if broken and readily removed from the brackets for sharpening without removing the cutter from the mower unit.

Another object is to provide in a mower unit of the above character improved means for supporting it for travel over uneven ground and vertically adjusting the cutter mechanism relative to the ground to vary the closeness of the cut, such means including a cutter-carrying frame having upright end plates, ground-engaging wheels at the lower rear ends of the plates and replaceable ground-engaging skids or runners adjacent each of the lower front ends of the end plates, the runners being pivotally hung at their rear ends on a rod connecting the end plates and having their upturned front ends adjustably fastened to the front portions of the end plates.

Another object is to provide in a mower unit of the above character, an improved frame with bearings for the shaft of the cutter and having at each end means for

2 pivotally connecting it to the end of an adjoining mower unit, such means permitting the cutter shafts of two adjoining mower units to be connected by a driving spring-connection when a single motor on one frame is to be used to drive the cutter of an adjoining mower unit or adjoining units.

With the above and other objects and advantages in view, the invention resides in the novel combinations and arrangements of parts and the novel features of construction hereinafter described and claimed, and illustrated in the accompanying drawings which show the present preferred embodiments of the invention.

In the drawings:

FIG. 1 is a diagrammatic view showing one use of the improved mower unit;

FIG. 2 is an end view of one of the mower units;

FIG. 4 is a front view of what is shown in FIG. 3;

FIG. 5 is a top plan view of one of the runners on a reduced scale;

FIG. 6 is a detail sectional view on line 6—6 in FIG. 4; and

FIG. 7 is a detail section on line 7—7 in FIG. 6.

Figure 3:
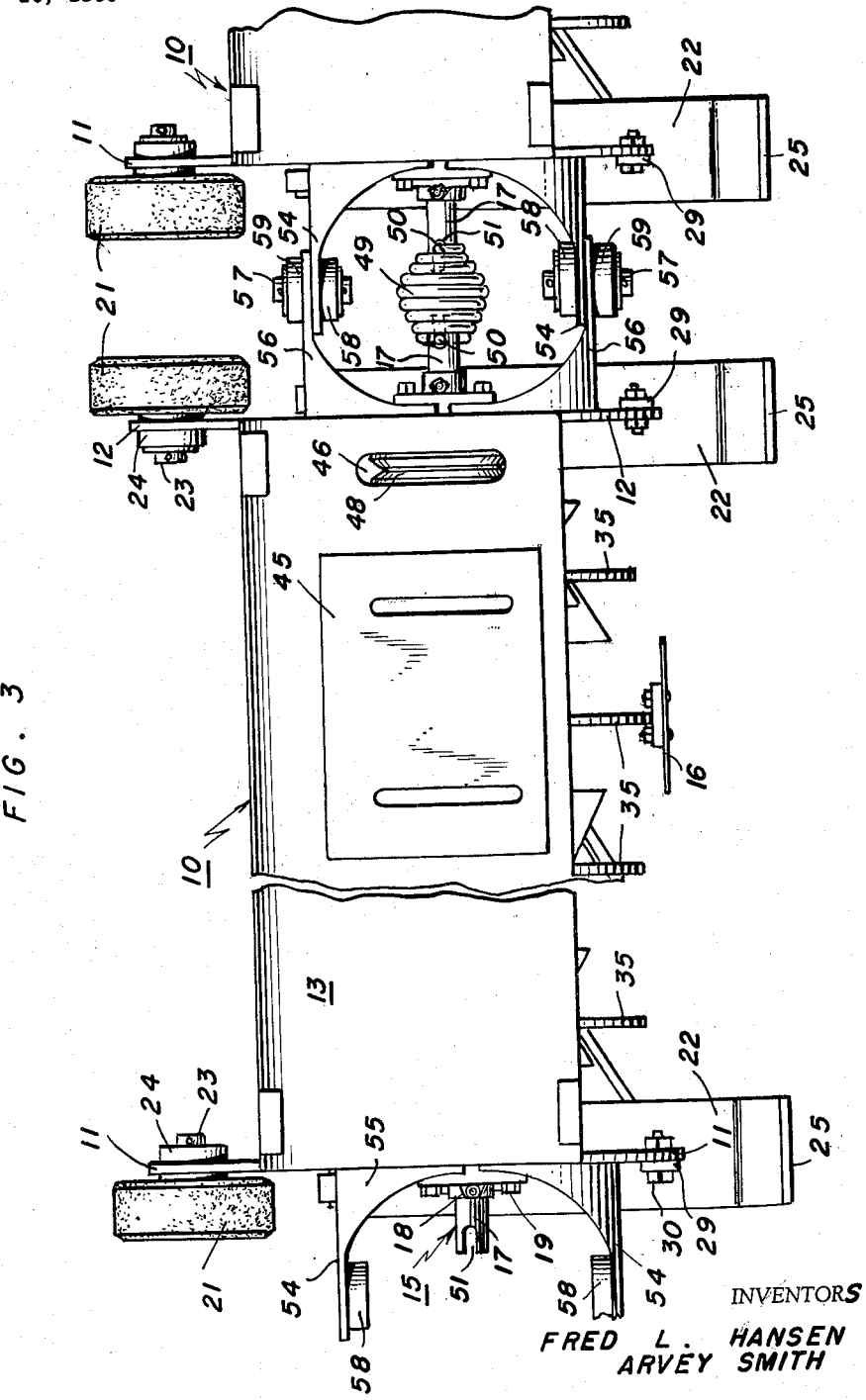
FIG. 3 is a top plan view, with parts broken away, of one mower unit coupled to an end portion of an adjoining unit.

Referring more in detail to the drawings the numeral 10 denotes the mower unit as a whole and while it may be individually powered and used, it is shown as adapted to be used in a gang or group of mowers. Each mower unit comprises an elongated frame or housing which supports a power-driven rotary cutter and includes two upright end plates 11 and 12 connected at their tops by a transversely curved top plate 13 and at their bottom portions by a tie rod 14. Extending longitudinally through the central portion of the frame is rotary cutter shaft 15 carrying cutter blades or knives 16, as presently described, the shaft having reduced ends 17 which extend through and beyond the end plates and are mounted in anti-friction self-alining bearings 18 bolted to the outer faces of the end plates as at 19. To permit the assembled cutter to be positioned in the frame, the end plates 11 and 12 are formed with vertical slots 20 which open through their bottom edges, as seen in FIG. 2; and which receive the projecting ends 17 of the shaft.

The frame is supported at the rear by two suitably tired ground-engaging wheels 21 and at the front by two adjustable skids or runners 22 so that the cutter blades 16 may be adjusted vertically relative to the ground. The rear wheels 21 are positioned on the outer sides of the end plates 11 and 12 at their lower rear corners, and they may be rotatably mounted by axle pins 23 rotatable in bearing bosses 24 welded on the inner faces of the two plates. The runners 22 are disposed under the forward portions of the end plates and each comprises an elongated metal plate of rectangular shape with an upturned curved forward end 25 and a reduced rear end 26 which is bent to extend upwardly and rearwardly and then bent to form a hook 27. When the runner is disposed beneath the end plate, as seen in FIG. 2, the reduced end 26 will be positioned against the inner face of the end plate and the curved hook 27 is shaped to engage and pivot on a cylindrical portion of the tie rod 14, thus pivotally mounting the rear end of the runner. Adjacent the front portion of the runner is welded a flat upright post or arm 29 adapted to engage the outer face of the end plate. The arm is apertured to receive a clamping bolt 30 adapted to be inserted in any one of an arcuate row of holes 31 formed in the end plate, as will be understood upon reference to FIG. 2. Thus the runner may be vertically adjusted on the end plate to dispose the path of rotation of the blades 16 at different distances above the ground.

The cutter is operated at a relatively high speed so that the blades 16 will cut the grass and weeds without the use of a stationary cutter bar or ledger plate. The blades 16 are short flat plates of suitable metal and of generally rectangular outline with one longitudinal edge 34 beveled to form a cutting edge. An annular series of the blades is mounted on each of a plurality of spiders preferably in the form of plates or disks 35 welded as at 36 to the shaft 15 at equally spaced points. The blades are not only disposed tangentially or substantially tangentially to the peripheries of the disks, but they extend at an angle to the longitudinal axis of the shaft 15 and they are fastened to the disks midway of their ends as seen in FIG. 4. Preferably three equally spaced blades are mounted on each disk, and the length of the blades and the spacing of the disks along the shaft are such that the ends of the blades on adjoining disks slightly overlap, as shown in FIG. 4, the blades on adjoining disks being, of course, staggered around the peripheries of such disks.

Since the knives or blades may be broken or damaged by striking a stone or unmovable object and since they must be sharpened from time to time, they are removably mounted. When the spiders 35 are in the form of disks, their peripheries are formed with notches 38 in which are welded as at 39 transversely extending generally rectangular shaped bracket plates 40 to which the blades are fastened by removable screw threaded fastenings. As shown the flat brackets 40 extend transversely across the periphery of the disk at the same angle as the blades and are formed with holes 41 to receive screws or bolts 42, which are also received in holes 43 formed in the blade. By thus mounting the blades and constructing the frame or housing so that it has a large front opening the blades are readily accessible. Hence the blades may be quickly and easily removed for sharpening and replaced if broken or damaged.

The cutter shaft 15 may be driven by a suitable motor represented at 44 in FIG. 4 and mounted on an inverted U-shaped platform 45 welded on the top plate 13 adjacent to one of its ends. This platform may be slotted as shown in FIG. 3 so the base of the motor or engine may be bolted thereto. The plate 13 is formed with a slot 46 for a driving belt 47 passed around a pulley 48 on the shaft 15 and a pulley on the motor shaft. When a number of the mower units 10 are coupled together end to end to form a flexible gang mower, a driving connection is provided between the cutter shafts of adjoining units so that a motor on one of the units may be used to rotate the cutters of two or more of the alined units.

As previously noted the disclosed embodiment of the invention is particularly adapted for use in a flexible gang mower since improved means are shown for pivotally connecting the frame of one mower unit to the frame of an adjoining unit and holding a spring coupling and driving connection between the cutter shafts of the adjoining units in association with such shafts. The driving connection between the shafts 15 comprises a coil 49 of heavy resilient wire of the shape shown in FIG. 4, the coil being adapted to receive the ends 17 of the two shafts. The convolutions of the coil towards its ends decrease in size and the two ends 50 of the wire are bent to extend diametrically of the axis of the coil but in opposite directions. These ends 50 are adapted to slide into the ends of diametrically extending notches or slots 51 formed in the reduced ends 17 of the shafts 15; and they are retained in such notches by the following described pivotal connection between the frames of the adjoining mower units. On the outer face of the end wall 11 is welded a pair of widely spaced upright parallel plates 54, the upper reduced ends 55 of which are curved inwardly so that these plates strengthen the end plate 11. Similar upright plates 56 are welded on the outer face of the other end plate 12 but they are spaced more widely apart so that the plates 54 on one unit may be positioned between the plates 56 of an adjoining unit, as shown in FIG. 3. The tapered overlapped outer end portions of the plates 54, 56 are formed with alined bearing openings to receive alined pivot pins 57 whereby frames of adjoining mower units are pivotally connected. In order to strengthen these pivotal connections the plates or arms 54 have welded to their inner faces bearing bosses 58 and the plates or arms 56 have similar bearing bosses 59 welded to their outer faces, the pivots 57 being retained in such bearings by washers and cotter pins as seen in FIG. 3.

The row of flexibly joined mower units may be pulled over a terrace or inclined surface along a railway road bed or a highway in various ways but in FIG. 1 is shown three of the units 10 arranged on a terrace or slope S at one side of a highway H, the units being connected by draft bars 63 to an inclined boom 64 which extends from one side of a tractor T. The boom has its upper end pivoted at 65 on a collar or sleeve 66 vertically adjustable on an upright post 67 on the tractor or on a car running on rails. The vertically swinging boom is also adjusted by a cable 68 connected to it and passed over a pulley at the top of the post and then down to a suitable windless (not shown) on the tractor or car. By adjusting the boom and the units along the boom, the mowers may be placed in working positions to cut the desired area. The tractor or car may carry an electric generator unit 69 to supply current to electric motors on one or more of the mower units 10. In order to cut the vegetation that is not cut by the row of mower units because of the spacing of the cuters of adjoining units, rear mower units may be used and towed by the units in the front row. One rear unit mounted in tandem for every two units in the front row may be used. These rear or trailing units may have their ends connected by tow bars to the frames of two of the units of the front row, ball and socket joints or the like being provided at the ends of the tow bars or arms, so that the rear trailing units will be flexible or able to oscillate. By thus mounting the mower units, the tractor may travel along one side of a highway close to the usual fence or guard rail F.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

What is claimed is:

1. In a gang mower of the character set forth, a plurality of horizontally extending mower units disposed end to end along a substantially straight line, each of said units having an elongated frame comprising a pair of upright end plates disposed in parallel spaced relation and horizontally extending connecting members rigidly uniting the end plates at the top and rear portions of the latter, ground engaging wheels journalled on said end plates of each pair to support the rear portions of said frames, ground engaging runners mounted on said end plates of each pair to support the front portions of said frames, a rotary shaft extending longitudinally through each frame and journalled in the intermediate portions of the respective end plates, a plurality of longitudinally spaced annular series of circumferentially spaced cutter blades carried by each of said shafts and rotatable therewith in substantially vertical planes, means pivotally connecting said frames for vertical movement of one frame relative to the other, said means comprising pairs of laterally spaced upright connecting plates projecting from the opposed end plates of adjoining frames, the connecting plates of each pair being disposed on opposite sides of vertical planes passing through the axes of said shafts, the connecting plates on opposed end plates of adjoining frames being disposed in overlapping relation and axially alined pivots connecting the overlapped portions of the respective connecting plates, and means for driving said shafts.

2. In a gang mower of the character set forth, a plurality of horizontally extending mower units disposed end to end along a substantially straight line, each of said units having an elongated frame comprising a pair of upright end plates disposed in parallel spaced relation, a generally horizontal top plate connecting the upper portions of said end plates and a longitudinally extending rod disposed at the rear of the frame and connecting the lower portions of said end plates, ground engaging wheels journalled on said end plates of each pair to support the rear portions of said frames, adjustable ground engaging runners mounted on said end plates of each pair to support the front portions of said frames, vertical slots formed in the intermediate portions of said end plates and opening through the bottom edges of the latter, alined shaft bearings removably mounted on said end plates of each frame at the upper ends of the respective slots, a rotary shaft extending longitudinally through each frame and journalled in the respective bearings, cutter blades carried by each of said shafts and rotatable therewith in substantially vertical planes, means pivotally connecting said frames for vertical movement of one frame relative to the other, said means comprising pairs of laterally spaced upright connecting plates projecting from the opposed end plates of adjoining frames, the connecting plates of each pair being disposed on opposite sides of the respective bearings, the end portions of said connecting plates of adjoining frames being disposed in overlapping relation and axially alined pins connecting the overlapped end portions of the pairs of connecting plates, and means for driving said shafts.

3. The combination of claim 2 in which said pivot pins are disposed in a horizontal plane passing through the axis of said shafts, together with a driving spring connection between the adjacent ends of the shafts of the adjoining frames that are pivotally connected, and in which said means for driving said shafts comprises at least one motor mounted on one of said frames and having a driving connection to the shaft of that frame.

References Cited in the file of this patent

UNITED STATES PATENTS

| | | |
|---|---|---|
| 1,235,649 | Braun | Aug. 7, 1917 |
| 1,876,818 | Worthington | Sept. 13, 1932 |
| 2,110,147 | Mable | Mar. 8, 1938 |
| 2,191,426 | Clapper | Feb. 20, 1940 |
| 2,362,456 | Alden | Nov. 14, 1944 |
| 2,365,338 | Godwin | Dec. 19, 1944 |
| 2,509,343 | Henderson | May 30, 1950 |
| 2,724,227 | Godwin | Nov. 22, 1955 |
| 2,753,674 | Cunningham et al. | July 10, 1956 |